(12) United States Patent
Bair et al.

(10) Patent No.: US 6,465,587 B1
(45) Date of Patent: Oct. 15, 2002

(54) POLYMERIC FLUID LOSS ADDITIVES AND METHOD OF USE THEREOF

(75) Inventors: Keith A. Bair, Landenberg; Fu Chen, West Chester, both of PA (US); Mohand Melbouci, Wilmington, DE (US); Teng-Shau Young, Wilmington, DE (US); De-Kai Loo, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/732,537

(22) Filed: Dec. 8, 2000

(51) Int. Cl.$^7$ .................. C08F 228/02; C08F 230/02
(52) U.S. Cl. .................. 526/240; 526/274; 526/287
(58) Field of Search .................. 526/240, 287, 526/271, 273, 274, 277, 288

(56) References Cited

U.S. PATENT DOCUMENTS

| | | | |
|---|---|---|---|
| 3,898,037 A | 8/1975 | Lange et al. ............. 21/2.7 |
| 4,578,267 A | 3/1986 | Salamone ............... 424/78 |
| 4,581,821 A | 4/1986 | Cahalan et al. .......... 28/877 |
| 4,587,238 A | * 5/1986 | Hille .................. 524/3 |
| 4,670,164 A | 6/1987 | Watson et al. .......... 252/8.511 |
| 4,687,516 A | 8/1987 | Burkhalter et al. ....... 106/90 |
| 4,717,542 A | 1/1988 | Mitchell ............... 422/15 |
| 4,895,663 A | 1/1990 | Chen .................. 210/701 |
| 4,895,664 A | 1/1990 | Chen .................. 210/701 |
| 4,944,885 A | 7/1990 | Chen .................. 210/701 |
| 5,032,295 A | 7/1991 | Matz et al. ............ 252/8.51 |
| 5,169,537 A | 12/1992 | Chen .................. 210/701 |
| 5,180,498 A | 1/1993 | Chen et al. ............ 210/697 |
| 5,403,821 A | 4/1995 | Shioji et al. ........... 507/119 |
| 5,663,123 A | 9/1997 | Goodhue, Jr. et al. .... 507/225 |
| 5,670,558 A | 9/1997 | Onishi et al. .......... 523/112 |
| 5,674,275 A | 10/1997 | Tang et al. ............ 607/152 |
| 5,710,108 A | 1/1998 | McNally et al. ......... 507/110 |

OTHER PUBLICATIONS

Encyclopedia of Chemical Technology, 3rd Ed., vol. 17, pp. 143–167.

* cited by examiner

*Primary Examiner*—Christopher Henderson
(74) *Attorney, Agent, or Firm*—David Edwards

(57) ABSTRACT

The present invention relates to compositions and use of water-soluble or water-dispersible copolymers for oil field applications. Specifically, the present invention relates to polymers containing allyloxy linkage and its functional dervatives for use in oil field applications as fluid additives for drilling and cementing processes.

29 Claims, No Drawings

POLYMERIC FLUID LOSS ADDITIVES AND METHOD OF USE THEREOF

FIELD OF THE INVENTION

The present invention relates to the composition and use of water-soluble or water-dispersible copolymers for oil field applications. Specifically, the present invention relates to polymers containing allyloxy linkage and its functional derivatives for use in oil field applications as fluid additives for drilling and cementing processes.

BACKGROUND OF THE INVENTION

Polymers are used extensively in oil field application as fluid additives for drilling, cementing, gas and oil well fracturing and enhanced—oil-recovery processes. Synthetic, organic, and inorganic polymers, as well as cellulose ethers and guar gum and guar derivatives, are widely used in oil field applications. These materials are also applied in a variety of formation-damage control applications and as dispersing agents.

In the initial drilling operation of an oil or gas well, a drilling fluid, commonly referred as "drilling mud," is pumped under pressure down to a string of drill pipes through the center of the drilling bit, back through the space or annulus between the outside of the drilling stem and the borehole wall, and finally back to the surface. After a well has been drilled and oil discovered, one or more subterranean, hydrocarborn-producing formations are most often encountered. The well is then completed to obtain the maximum hydrocarbon production from the subterranean producing formations.

Completion of a well refers to the operations performed during the period from drilling-in the pay zone until the time the well is put into production. These operations may include additional drilling-in, placement of downhole hardware, perforation, sand control operations, such as gravel packing, and cleaning out downhole debris. A completion fluid is often defined as a wellbore fluid used to facilitate such operations. The completion fluid's primay function is to control the pressure of the formation fluid by virtue of its specific gravity. The type of operation performed, the bottom hole conditions, and the nature of the formation will dictate other properties, such as viscosity. Use of completion fluids also clean out the drilled borehole. Oil well cement compositions are used in the completion operation to make a permanent, leak proof well for continuous use.

In cementing operations of gas or oil wells, a hydraulic cement is normally mixed with sufficient water to form a pumpable slurry and the slurry is injected into a subterranean zone to be cemented. After placement in the zone, the cement slurry sets into a hard mass. In primary cementing, where a cement slurry is placed in the annulus between a casing or liner and the adjacent earth formations, loss of fluid is a major concern. The formations can result in premature gelation of the cement slurry and bridging of the annulus before proper placement of the slurry. In remedial cementing operations, the control of fluid loss is necessary to achieve the more precise cement slurry placement associated with such operations.

Among all other slurry properties, fluid loss control is one of the critical concerns for cement slurry formulation, especially at high temperature, high pressure (squeeze cement) and salt environments. The main purpose of fluid loss additives is to prevent the dehydration of the cement slurry that can reduce its pumpability as well as affecting its other designed properties. Loss of a significant amount of water from the cement slurry can cause changes in several important job parameters, such as reduced pumping time and increased frictional pressure. Fluid loss additives are used to help prevent water loss from cement slurries to the rock formation as the slurry is pumped into the annulus between the casing and the well bore. This allows displacing the maximum amount of mud, compressive strength development, and bonding between the formation and the casing. In fact, under harsh conditions and due to permeable zones, the slurry can dehydrate quickly and become unpumpable, preventing the extension of slurry into voids and channels, particularly where the annular space between the liner and the open hole is too narrow. Any bridging problem due to high fluid loss would considerably disturb the cement job and affect the integrity of the cement column.

Deep oil wells are generally subjected to high temperature gradients that may range from 40° F. at the surface to 400° F. at the bottom hole. The geology of the well traversed may also contain environments, such as massive salt formations, that can adversely affect the cementing operation.

In general, two types of fluid loss additives are used in the cementing industry. They are classified as low temperature (<230° F.) or high temperature (>230° F.) fluid loss additives ("FLACs"). Synthetic polymers and derivatives of polysaccharides are used in oil field operations from the drilling fluids to the completion fluids as well as in oil well cements.

Partially hydrolyzed polyacrylamide and copolymers of acrylamide, and sodium acrylate, acrylic acid are commonly used in the oil field. Replacing the acrylamide amide hydrogen atoms by other groups reduces the hydrolysis rate and increases viscosity in brines of the polymers. Homopolymers and acrylamide copolymers of 2-acrylamide-2-methylpropanesulfonic acid and salts, N-methylacrylamide, N-isopropylacrylamide , N-butylacrylamide, N,N-dimethylacrylamide, N-hydroxymethylacrylamide, N-hydroxymethylacrylamide and other N-alkylacrylamides have been disclosed for use in polymer flooding. Terpolymers of acrylamide, acrylic acid and 2-hydroxypropylacrylate prevent fluid-loss in drilling mud. Other monomers such as N-vinylpyrrolidinone, vinylchlroide, vinylsulfonate, styrene and styrene sulfonate, maleic anhydride and various vinyl acrylates are also used in copolymerizing acrylamide or acrylic acid for drilling fluid applications. However, these conventional acrylamide copolymers are not hydrolytically and thermally stable at severe operating conditions such as under extreme high temperature and high salt content and a caustic environment.

Examples of polysaccharides derivatives are cellulose ether compounds such as methylcellulose(MC), ethylcellulose(EC), carboxymethylcellulose(CMC), hydroxyethylcellulose(HEC), hydroxypropylcellulose (HPC), carboxymethylhydroxyethylcellulose(CMHEC), ethylhydroxyethylcellulose (EHEC) and hydrophobically modified hydroxyethylcellulose(HMHEC). Examples of guar derivatives are hydroxyethyl guar and hydroxypropyl guar. These cellulose and guar compounds are used in drilling fluids and cementing spacers to suspend solid particles, and in fracturing fluids to suspend sand and other proppants and to prevent fluid loss in these applications. However, due to its polysaccharide structure and acetal linkage, these naturally derived materials are subject to hydrolysis at temperature above 350° F. and high levels of salt in deep well conditions.

DESCRIPTION OF RELATED ART

U.S. Pat. Nos. 4,895,663, 4,895,664 and 4,944,885 (Chen) disclose using copolymers of acrylic acid and sodium 3-allyloxy 2-hydroxypropanesulfonate (AHPS) as a scale inhibitor and deposti control agent for cooling water treatment.

Water soluble copolymers containing 2-acrylamido-2-methylpropanesulfonic acid (AMPSR) are described in U.S. Pat. Nos. 3,898,037; 4,641,793 and 4,717,542. The copolymers are used for water treatment in general.

U.S. Pat. No. 5,032,995 (Matz et al.) discloses an ampoteric copolymers containing nonionic, anionic and cationic monomers for use as deflocculants in drilling mud.

U.S. Pat. No. 5,169,537 (Chen) discloses using terpolymers of acrylic acid, 3-alloxy-2-hydroxypropanesulfonate and sodium 3-allyloxy 2-hydroxypropanesulfonate as a scale inhibitor.

U.S. Pat. No. 5,403,821 (Shioji) describes water soluble anionic copolymers containing carboxylic acid and allyl ether sulfonate moieties, having an average molecular weight of 1,000 to 50,000 as drilling additives for stabilizing muddy water.

None of the aforementioned prior art describes the specific copolymers of the present invention for oil field applications, especially in cementing as fluid loss additives (FLAC). Hence, a need still exists in the oil field industry for thermally and hydrolytically stable materials for use in high temperature oil field applications.

SUMMARY OF THE INVENTION

The present invention relates to copolymers containing allyloxy linkage and its functional derivatives as oil field fluid loss additives in drilling operations. Specifically, copolymers containing acrylamide, and 3-allyloxypropanesulfonate ("AHPS") and other monomers are synthesized for the applications. The AHPS component of the copolymers is thermally and hydrolytically stable at high pH, saturated salt and elevated temperature conditions. Copolymers of the invention are efficacious as oil well cement slurry additives for rheology and fluid loss purposes, especially at high temperatures.

The present invention also relates to an oil filed cement composition comprising cement and the above mentioned copolymers as a fluid loss additive.

The present invention also comprehends an oil field fluid composition comprising the above mentioned composition and at least one oil field ingredient.

DETAILED DESCRIPTION OF THE INVENTION

Surprisingly, it has been discovered that certain water-soluble or water dispersible copolymers are effective in preventing fluid loss in oil field cementing applications and in oil field fluids from drilling fluids to completion fluids.

The present invention relates to copolymers containing allyloxy linkage and its functional derivatives for oil fluid loss application. Specifically, copolymers containing acrylamide and 3-allyloxyhydroxypropanesulfonate (AHPS) and other monomers are synthesized. The AHPS component of the copolymers is thermally and hydrolyticly stable at high pH, in saturated salt, and at elevated temperature conditions. Copolymers of the invention are especially efficacious as oil well cement slurry additives for rheology and fluid loss purposes, especially at high temperature.

One component of the copolymer of the present invention comprises monomeric repeat unit(s) of alpha, beta ethylenically unsaturated compound of Formula (I)

$$-(E)-\qquad\text{Formula (I)}$$

Wherein E is the repeat unit obtained after polymerization of an alpha, beta ethylenically unsaturated compound, preferably a carboxylic acid, an amide form of the carboxylic acid, and a lower alkyl (C1–C6) ester or hydroxylated lower alkyl (C1–C6) ester of such carboxylic acid. Compounds from which E may be derived include the acrylic acid, methacrylic acid, acrylamide, maleic acid or anhydride, itaconic acid, crontonic acid, fumaric acid, styrene, styrene sulfonate, vinyl pyrrolidone, N-methylacrylamide, N-isopropylacrylamide, N-butylacrylamide, N,N-dimethylacrylamide, N-hydroxymethylacrylamide, N-hydroxymethylacrylamide and other N-alkylacrylamides. Water-soluble salt forms of the carboxylic acids are also within the purview of the invention.

Another component of the copolymers is the repeat unit formed by the polymerization of a monomer containing sulfonate functionality as shown in Formula (II)

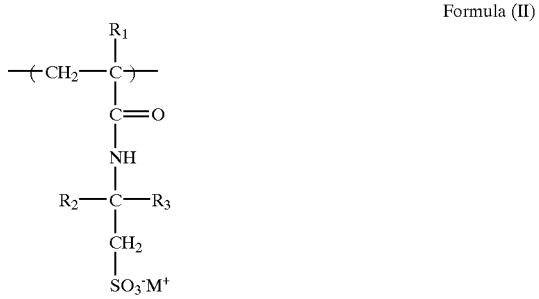

Formula (II)

wherein $R_1$ is hydrogen or a lower alkyl (C1 to C5), $R_2$ and $R_3$ are identical or different and denote hydrogen, or $C_1$ to $C_5$ alkyl groups; and, M is hydrogen or a water-soluble cation (e.g., $NH_4^+$, alkali metal). 2-Acrylamido-2-methylpropanesulfonic acid ($AMPS^R$) is a typical example of a Formula (II) monomer. However, compounds such as styrene sulfonate, vinyl sulfonate and allyl sulfonate also fall in the category.

A third component of the copolymer is the repeat unit formed by the polymerization of a substituted allyl alkylene ether compound as shown in Formula (III),

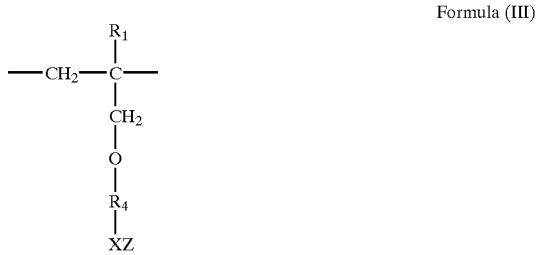

Formula (III)

Wherein $R_1$ is hydrogen or lower alkyl (C1–C5), $R_4$ is a hydroxyl substituted alkylene group having from 1 to about 6 carbon atoms or a non-substituted alkyl or alkylene group having from 1 to about 6 carbon atoms; X is an anionic radical (e.g., sulfonate, phosphate, phosphite or phosphonate); and, Z is one or more hydrogen or a water soluble cation or cations which together counterbalance the charge of X. Compounds encompassed by Formula (III) include the repeat unit obtained after polymerization of 3-allyloxyhydroxypropanesulfonate, 3-allyloxyhydroxypropanesphosphite, and 3-allyloxyhydroxypropanesphosphate.

It is noted that more than one monomer unit in Formula I, II and III mentioned above may be present in the copolymers of the invention. Therefore, the polymer of the present invention is comprised of copolymer, terpolymer and tetrapolymer or more wherein two, three, four or more different monomeric repeat units selected from the repeat units described in Formulas I, II, and III are present in the polymer. There is no limit to the kind and mole percent of the monomers chosen so long as the total mole percent adds up to 100 mole % and the resulting copolymers are water soluble or water dispersible.

Branching or cross-linking agents such as methylenebis(meth)acrylamide, polyethyleneglycol di(meth)acrylate, hydroxyacrylamide, allyl glycidyl ether, glycidyl acrylate and the like may also be added for the copolymers.

Solution, emulsion, and dispersion or gel polymerization techniques may be used to polymerize the monomers described. Conventional polymerization initiators such as persulfates, peroxides and azo type initiators may be used. Polymerization may also be initiated by radiation or ultraviolet mechanism. Chain transfer agents such as alcohols (preferably isopropanol), allyl alcohol, amines or mercapto compounds may be used to regulate the molecular weight of the polymer. It is to be understood that the aforementioned methods of polymerization do not in any way limit the synthesis of polymers according to this invention.

A preferred copolymer composition comprises (A) acrylamide or a substituted acrylamide; (B) a monomer containing sulfonate functionality; (C) of a substituted allyl alkylene ether compound; and, (D) of a monomer containing carboxylic acid functionality wherein the mole percentages of components (A), (B), (C) and (D) are from 5% to 95% with the proviso that the sum of mole % is 100.

The components are preferably present in the following mole percentages, wherein (A) is preferably from about 20 mol % to about 70 mol %, (B) is preferably from about 20 mol % to about 60 mol %, (C) is preferably from about 5 mol % to about 40 mol % and (D) is preferably from about 5 mol % to about 40 mol % with the proviso that the sum of the mol % is 100%. (A) is most preferably from about 40 mol % to about 60 mol %, (B) is most preferably from about 30 mol % to about 50 mol %, (C) is most preferably from about 10 mol % to about 30 mol % and (D) is most preferably from about 10 mol % to about 30 mol % with the proviso that the sum of the mol % is 100%.

Several aspects of the invention include copolymers of acrylamide /sodium 2-acrylamido-2-methylpropanesulfonate/3-alloxy-hydroxypropanesulfonate (AHPS) of Formula (IV)

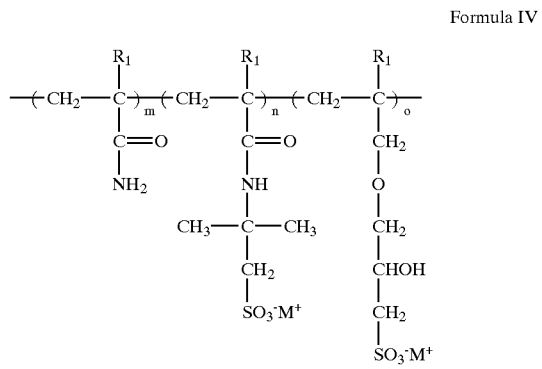

Formula IV and acrylamide /sodium 2-acrylamido-2-methylpropane sulfonate/sodium 3-allyloxy-2-hydroxypropanesulfonate/N-vinylpyrrolidone of Formula (V),

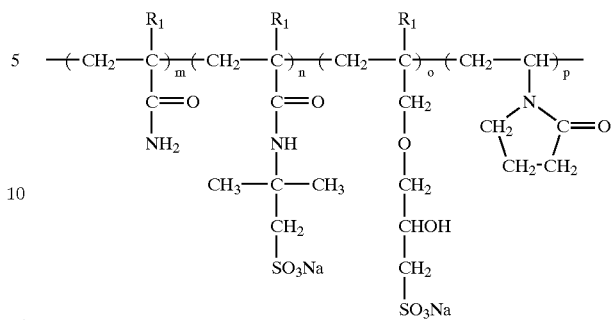

Formula (V)

and acrylamide /sodium 2-acrylamido-2-methylpropanesulfonate/ sodium 3-alloxy-hydroxypropanesulfonate (AHPS)/acrylic acid of Formula (VI),

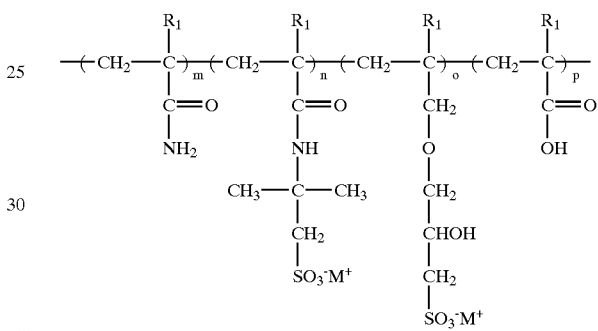

Formula (VI)

wherein $R_1$ is independently selected from hydrogen or lower alkyl (C1–C5), M is H or water soluble cation. The mole percent (m, n, o, p) for each of the monomers in the copolymers (IV), (V) and (VI) is in a random distribution to the extent of 5% to 95%. However, the sum of the components is 100 mole percent and the resulting copolymer is still water soluble or water dispersible.

The compound, 2-acrylamido-2-methylpropanesulfonic acid (AMPS[R]) is commercially available from the Lubrizol Corporation. Sodium 3-allyloxy-2-hydroxypropanesulfonate (AHPS) is available from BetzDearborn Division of Hercules Incorporated.

The copolymer compositions may also be used in combination with polysaccharides including cellulose ether compounds such as those selected from hydroxyethylcellulose, cationic hydroxyethylcellulose, methylcellulose, methylhydroxyethylcellulose, methylhydroxypropylcellulose, hydroxypropylcellulose, carboxymethylcellulose and blends thereof; starch and starch derivatives such as those selected from straight starch, pregelenatised starch, cationic starch, styrene butadiene starch, carboxymethylstarch, hydroxypropylstarch, hydroxyethylstarch and blends thereof; and guar and guar derivatives selected from straight guar, carboxymethylguar, hydroxypropylguar, carboxymethylhydroxypropylguar, cationic guar and blends thereof.

The polymers should be added to the system, in an amount effective for the specific application. This amount will vary depending upon the particular system for which treatment is desired and will be influenced by factors such as, type and composition of cement, pH, temperature, water quantity and the respective concentrations.

EXAMPLES

The invention will now be further described with reference to a number of specific examples which are to be regarded solely as illustrative, and not as restricting the scope of the invention.

Example 1

Preparation of Acrylamide/AMP$^R$/AHPS (mole % 75/12.5/12.5) Copolymer

An aqueous solution of 63.2 g of AMPS$^R$ sodium salt (50%, 0.14 mole), 110.4 g of acrylamide (53% 0.82 mole), and 1.1 g of methylene bisacrylamide was mixed well in a reaction flask and deoxygenated with nitrogen. An initiator solution containing 15% of sodium persulfate in deionized water was prepared separately and sparged with nitrogen.

A suitable reaction flask was equipped with an additional funnel, a thermometer, and an overhead agitator, 133.0 g of deionized water and 77.1 g of AHPS (38.8%, 0.14 mole) were charged to the flask and heated to 70° C. under a nitrogen blanket. The deoxygenated aqueous monomer solution prepared previously was added along side with 19.2 g of the aqueous sodium persulfate solution prepared in 120 minutes. After the addition, the reaction mixture was kept at 70° C. for another hour before being cooled to room temperature.

The structure of the resulting copolymer was verified by $^{13}$C NMR. The spectra showed broad and complex C—C peaks at 25–75 ppm and multiple carbonyl peaks at 175–182 ppm. The Brookfield viscosity of the resulting copolymer solution at 22° C. was 700 cps. The weight average molecular weight of the copolymer as determined by size exclusion chromatography ("SEC") was 120,000 with a polydispersity of 5.5.

Example 2

Preparation of Acrylamide/AMPS$^R$/AHPS/N-vinyl pyrridone ("NVP") (mole % 25/25/25/25) Copolymer An aqueous solution of 146.6 g of AMPS$^R$, Na (50%, 0.32 mole), 35.2 g (0.32 mole) of N-vinyl pyrrolidinone (NVP), 42.5 g of AM (53%, 0.32 mole), and 1.1 g of N,N-methylenebisacrylamide was mixed well in a reaction flask and deoxygenated with notrogen. An initiator solution containing 15% of sodium persulfate in deionized water was prepared separately and sparged with nitrogen.

Utilizing the apparatus and procedure as described in Example 1, 178.4 g of AHPS (38.8%, 0.32 mole) was charged to the flask and heated up to 50° C. under a nitrogen blanket. The deoxygenated aqueous monomer solution was added along side with 13.3 g of the sodium persulfate solution in 300 minutes to the flask. The reaction temperature was maintained at 50° C. during the addition. After the addition, the solution was kept at 50° C. for another hour. The reaction mixture was then cooled to room temperature.

The structure of the resulting copolymer was verified by $^{13}$C NMR. The spectra showed broad and complex C—C peaks at 18–75 ppm and multiple carbonyl peaks at 175–182 ppm. The Brookfield viscosity of the resulting copolymer solution at 22° C. was 22,250 cps. The weight average molecular weight of the copolymer as determined by SEC was 637,000 with a polydispersity of 18.3.

Example 3

Preparation of Acrylamide/AMPS/AHPS/acrylic Acid (mole % 46/31/14/9)Copolymer

An aqueous solution of 179.32 g of AMPS$^R$ Na (58%, 0.45 mole), 46.07 g of acrylamide (0.65 mole), and 0.29 g of N,N'-methylenebisacrylamide was mixed well in a reaction flask and then sparged with nitrogen. An initiator solution containing 9.0% of sodium persulfate in deionized water was prepared separately and purged with nitrogen.

111.66 g of AHPS (38.8%, 0.20 mole) was charged to the flask and heated to 60° C. under a nitrogen blanket. 0.69 g of persulfate solution was added to the flask. Approximately 67 weight % of aqueous monomer solution prepared previously was added in 140 minutes. The remaining monomer solution was added in 60 minutes afterwards. 6.19 g of the persulfate solution was added in the 200 minute period. After the addition, the reaction mixture was kept at 60° C. for 30 minutes. The reaction mixture was heated to 80° C. and 6. 88 g of persulfate solution was added in 30 minutes. Acrylic acid (9.34 g, 0.13 mole) was added to the reaction mixture at 80° C. along side with 20.6 g (9.0%) of the initiator solution in 15 minutes. After completing the addition, temperature of the reaction mixture was kept for 30 minutes. A solution of 16.7 g (10%) of sodium bisulfite was added and the reaction product was cooled down to room temperature.

The structure of the resulting polymer was verified by $^{13}$C NMR. The spectra showed broad and complex C—C peaks at 25–75 ppm and multiple carbonyl peaks at 175–182 ppm. The Brookfield viscosity of the resulting polymer at 22° C. was 6,300 cps. The weight average molecular weight of the copolymer as determined by size exclusion chromatography (SEC) was 537,000 with a polydispersity of 23.2.

Example 4

Preparation of Acrylamide/AMPS/AHPS/acrylic Acid (mole % 42/29/12/17) Copolymner An aqueous solution of 139.73 g AMP$_R$ Na (58%, 0.35 mole), 35.89 g of acrylamide (0.51 mole), and 0.29 g of N,N'-methylenebisacrylamide was prepared in a reaction flask and sparged with nitrogen. An initiator solution containing 9.0% of sodium persulfate in deionized water was prepared separately and purged with nitrogen.

87.01 g of AHPS (38.8%, 0.15 mole) and 214 g of deionized water were charged to the flask and heated to 60° C. under nitrogen blanket. 0.53 g of persulfate initiator solution was added to the flask. Then the deoxygenated aqueous monomer mixture prepared previously was added in 200 minutes along side with 4.81 g of the initiator solution. Following the addition of monomer mixture, the solution was heated for additional 30 minutes. After that, the reaction temperature was raised to 80° C. and 5.35 g of persulfate solution was added. Acrylic acid (14.56 g, 0.21 mole) was added in 60 minutes along side with 32.1 g of the initiator solution. After the addition, the reaction mixture was kept at 80° C. for 30 minutes. A solution of 16.7 g (10%) of sodium bisulfite was added and the resulting polymer solution was cooled to room temperature.

The structure of the resulting polymer was verified by $^{13}$C NMR. The spectra showed broad and complex C—C peaks at 25–75 ppm and multiple carbonyl peaks at 175–182 ppm. The Brookfield viscosity of the resulting polymer at 22° C. was 2,480 cps. The weight average molecular weight of the copolymer as determined by size exclusion chromatography (SEC) was 322,000 with a polydispersity of 16.5.

Thermal and Hydrolytic Stability

To evaluate thermal and hydrolytic stability of the copolymer, a copolymer of the present invention was dissolved in saturated NaCl aqueous solution at pH~12 at 5% concentration and heated at 400° F. in a pressure reactor (500 psi). After heating for four and half hours at this condition, the polymer solution was analyzed by $^{13}$C NMR. The results indicated that the AHPS component of the copolymer remained unchanged. No hydrolysis of allyloxy linkage and dehydration of hydroxyl group were observed. Under the same conditions, however, about 50% of AMPS$^R$ molecules and 100% of AM molecules in copolymers were hydrolyzed to carboxylic acid.

Performance Testing of Oil Well Cement Slurries

The performance testing of the oil well cement slurries were conducted in terms of rheology and fluid loss properties at variable bottom hole cement temperatures ("BHCT"). Typically, the rheology was measured just after the slurry preparation at room temperature (~80° F.), to simulate the mixing and pumping at the surface, and after conditioning the slurry under BHCT (~180° F.) for 20 minutes as recommended by the American Petroleum Institute ("API"). The fluid loss properties were measured at BHCT temperature after the slurry conditioning.

First, a dry cement mixture was prepared by adding 600 g of cement class "H" (Long Star), 210 g of silica flour (35% by weight of cement ("BWOC")) and 6 g of calcium lignosulfonate(1% BWOC) into a dry container and mixed well with a spatula. Separately, 303 g of demineralized water and 9 g (1.5% active BWOC) AHPS based copolymer were added into a Warring Blendor and mixed thoroughly (4000 rpm) to dissolve the copolymer.

The oil well cement slurry was then prepared by adding the cement dry mixture into the solution of water and the copolymer. While mixing at about 4000 rpm, all of the dry mixture was added within a period of time not exceeding 30 seconds. After the addition of all the dry mixture, the slurry was then mixed for additional 35 seconds at high speed (12000 rpm). The rheology of the slurry was then measured with a FANN 35 viscometer at room temperature.

To simulate downhole circulating conditions, the slurry was then left for conditioning at the test temperature (BHCT) for 20 minutes. In the mean time, a high pressure/high temperature ("HPHT") fluid loss cell was pre-heated at the required test temperature.

After conditioning the slurry, the rheology was measured again at the test temperature as above as well as the fluid loss properties. The fluid loss properties are expressed as API fluid loss when the volume collected corresponds to the filtrate collected after 30 minutes testing or as calculated fluid loss when the test blows out before the test reaches 30 minutes.

For equipment availability reasons, the pressure differential used in testing was limited to 500 psi instead of the 1000 psi as recommended by API.

The copolymer of Examples 1 and 2 were used in solutions of 33.2% and 10% total solids respectively. For performance testing, 1.5% active polymer, based on weight of cement (BWOC), were used in each of the cement slurry formulations. The ingredient formulation of the tests are set forth in Table 1. The slurry and fluid loss performance data for the corresponding formulations are set forth in Table 2.

TABLE 1

Cement Slurry Formulations

| Ingredients | N° 1 Wt., g | N° 1 Wt. % BWOC | N° 2 Wt., g | N° 2 Wt. % BWOC | N° 3 Wt., g | N° 3 Wt. % BWOC | N° 4 Wt., g | N° 4 Wt. % BWOC |
|---|---|---|---|---|---|---|---|---|
| Cement, Class "H" | 600 | | 600 | | 600 | | 600 | |
| Silica Flour | 210 | 35 | 210 | 35 | 210 | 35 | 210 | 35 |
| Ca. Lignosulfonate | 6 | 1 | 6 | 1 | 6 | 1 | 6 | 1 |
| Example 1 (33.2% T.S.) | 27.11 | 1.5 (act.) | 36 | 2 (act.) | 27.11 | 1.5 (act.) | — | — |
| Example 2 (10% T.S.) | — | — | — | — | — | — | 90 | 1.5 (act.) |
| FWCA, 250 HHR-P HEC | — | — | — | — | 0.6 | 0.1 | — | — |
| Demi-water | 303 | 50.5 | 303 | 50.5 | 303 | 50.5 | 303 | 50.5 |

TABLE 2

Rheology and Fluid Loss Performance Testing Data

| | Test N° 1 | | Test N° 2 | | Test N° 3 | | Test N° 4 | |
|---|---|---|---|---|---|---|---|---|
| Rheology, Fann 35 | | | | | | | | |
| Test temperature | 77.4° F. | 180° F. | 77° F. | 179° F. | 77° F. | 181° F. | 77° F. | 180° F. |
| 300 rpm Dial Readings | 146 | 71 | 152 | 75 | >300 | >300 | 174 | 94 |
| DR 200 rpm DR | 100 | 44 | 104 | 47 | 282 | 185 | 130 | 66 |
| DR 100 rpm DR | 52 | 21 | 55 | 23 | 150 | 90 | 77 | 39 |
| DR 6 rpm DR | 6 | 2 | 7 | 2 | 14 | 7 | 15 | 5 |
| DR 3 rpm DR | 3 | 1 | 5 | 1 | 9 | 4 | 8 | 4 |
| Plastic viscvosity, cPs | 141 | 75 | 145.5 | 78 | # | # | 145.5 | 82.5 |
| Yield value, lb/100 ft$^2$ | 5 | −4 | 6.5 | −3 | # | # | 28.5 | 11.5 |
| Filtration, 500 psi | | | | | | | | |
| Test temperature | # | 180° F. | # | 179° F. | # | 180° F. | # | 180° F. |
| API fluid loss, ml | # | 25 | # | 18 | # | 49 | # | 44.5 |
| Remarks | # | Settlement | # | Settlement | # | Stable | # | Stable |

The data in the Table 2 indicate clearly that the copolymer of Example 1 performs efficiently as a fluid loss control additive for oil well cement slurries. Increasing the polymer concentration from 1.5% in test No. 1 to 2.0% BWOC in test No. 2 shows that the rheology remains almost unchanged while further reducing the fluid loss properties, due to the dispersing properties of the copolymer of Example 1. The dispersing properties of the copolymer were also visually observed by a quick settlement of the cement slurry at 180° F. when left at rest without mixing. This phenomenon can easily be described by the "negative" Yield point values of both tests No. 1 and 2. This is a good indication of over-dispersed cement slurry.

As a remedy to the over-dispersing problem, an anti-settling additive, known as free water control additive ("FWCA"), was added into the cement slurry formulation. High Mw HEC (Natrosol$^R$250 HHR manufactured by Hercules Incorporated) was added at a very low concentration (0.1% BWOC) to improve the slurry stability (test No. 3 in Table 1). As a result, the rheology was considerably increased and no settlement was observed (test No. 3 in the Table 2). However, the fluid loss was also increased. The fluid loss data of tests No. 1 and 2 may be biased by the quick settling of the cement in the filtration cell, leading to lower fluid loss values.

As previously discussed, the copolymer of Example 2 was tested at 1.5% active solids in the slurry formulations (test No. 4 in Table 1). The slurry prepared with this polymer was stable and no settlement was observed, thanks to the high yield values (test No. 4 in Table 2). This polymer did develop much higher rheology properties, due the high molecular weight of 637,000 with acceptable fluid loss value of 44.5 ml.

The copolymer of Example 3 (in solution of 30% total solids) was also tested at the same conditions as the copolymers of Example 1 and 2. The salt tolerance of the copolymer was performed by incorporating respectively 18% and 36% by weight of water (BWOW) NaCl into the cement slurry at each of the polymer dosage. The ingredient formulation of the tests are set forth in Table 3. The slurry and fluid loss performance data are set forth in Table 4.

TABLE 3

Cement slurry formulations

| | | Formulation | | | | | | | | |
|---|---|---|---|---|---|---|---|---|---|---|
| Ingredients | Wt., g | N° 5 Wt., % | N° 6 Wt. % | N° 7 Wt. % | N° 8 Wt. % | N° 9 Wt. % | N° 10 Wt. % | N° 11 Wt. % | N° 12 Wt. % | N° 13 Wt. % |
| Cement, Class "H" | 600 | — | — | — | — | — | — | — | — | — |
| Silica Flour | 210 | 35.00 | 35.00 | 35.00 | 35.00 | 35.00 | 35.00 | 35.00 | 35.00 | 35.00 |
| C-202 | 6 | 1.00 | 1.00 | 1.00 | 1.00 | 1.00 | 1.00 | 1.00 | 1.00 | 1.00 |
| Example 3 (30% T.S.) | | 1.50 | 1.50 | 1.50 | 1.00 | 1.00 | 1.00 | 0.50 | 0.50 | 0.50 |
| NaCl, BWOW | — | — | 18.00 | 36.00 | — | 18.00 | 36.00 | — | 18.00 | 36.00 |
| Demi-water | 303 | 50.50 | 50.50 | 50.50 | 50.50 | 50.50 | 50.50 | 50.50 | 50.50 | 50.50 |

TABLE 4

Rheology and Fluid Loss Performance Testing

Rheology and fluid loss performance data of Example 3 at 1.50% BWOC active polymer

| | Test N° 5 | | Test N° 6 | | | Test N° 7 | | |
|---|---|---|---|---|---|---|---|---|
| Salt Content | 0 | | 18%, BWOW | | | 36%, BWOW | | |
| Rheology, Baroid 286 | | | | | | | | |
| Slurry Conditioning | B.C. | A.C. | A.C. | B.C. | A.C. | A.C. | B.C. | A.C. | A.C. |
| Test temperature, ° F. | 82.7 | 81.7 | 171.6 | 83.2 | 80.3 | 174.7 | 80.4 | 77.8 | 169 |
| 300 rpm Dial Readings | >320 | >320 | 229 | 305 | 293 | 164 | 318 | 315 | 144 |
| DR 200 rpm DR | 234 | 245 | 152 | 225 | 310 | 107 | 241 | 232 | 102 |
| DR 100 rpm DR | 127 | 131 | 79 | 124 | 116 | 56 | 138 | 131 | 55 |
| DR 6 rpm DR | 9 | 9 | 5 | 9 | 8 | 4 | 7 | 10 | 4 |
| DR 3 rpm DR | 5 | 5 | 3 | 6 | 4 | 2 | 2 | 6 | 3 |
| Plastic viscvosity, cPs | #VALUE! | #VALUE! | 225 | 271.5 | 265.5 | 162 | 270 | 276 | 133.5 |
| Yield value, lb/100 ft$^2$ | #VALUE! | #VALUE! | 4 | 33.5 | 27.5 | 2 | 48 | 39 | 10.5 |
| Filtration, 1000 psi | | | | | | | | | |
| Slurry Conditioning | A.C. | A.C. | A.C. | A.C. | A.C. | A.C. | A.C. | A.C. | A.C. |
| Test temperature, ° F. | 80 | 180 | 350 | 80 | 180 | 350 | 80 | 180 | 350 |
| API fluid loss, ml | 12.8 | 18 | 24.8 | 14 | 18.4 | 27.6 | 12.6 | 18.6 | 32.4 |

The resulting performance data as shown in Table 4 above clearly indicate that the copolymers of the invention have outstanding filtration control properties for use in oil field applications as fluid loss additives. It is interesting to observe that the polymers efficiently control the fluid loss properties for temperatures varying from 80° to 350° F. The variation of the filtrate volume collected at 80° F. is similar to that collected at 350 OF (they are of same magnitude). This is an important finding since this would enable user on the field to predict the behavior of cement slurries at high temperature using information collected at lower, and more accessible, temperatures.

In addition to the high temperature stability, the data show that the copolymer of the invention has an outstanding salt tolerance. Despite the presence of 18% and 36% NaCl there is no adverse effect on the filtration properties, even at high temperature.

The level of filtrate collected at both low and high temperatures, with or without salt, makes this polymer not only suitable to cement "liners" or "squeeze cementing" jobs but also for primary cementing and shallow wells at low temperature. The other advantage is that there is no need to change/adapt their slurry formulations depending upon the well environment. The polymer is effective in most well conditions and formations. Though the cement slurry still remains manageable and pumpable at this dosage, the overall rheology data is a quite high. For that purpose, the polymer efficiency was tested at lower polymer dosage. The results are set forth in Table 5 and 6.

TABLE 5

|  | Test N° 8 | | | Test N° 9 | | | Test N° 10 | | |
| --- | --- | --- | --- | --- | --- | --- | --- | --- | --- |
| Salt Content | 0 | | | 18%, BWOW | | | 36%, BWOW | | |
| Rheology, Baroid 286 | | | | | | | | | |
| Slurry Conditioning | B.C. | A.C. | A.C. | B.C. | A.C. | A.C. | B.C. | A.C. | A.C. |
| Test temperature, °F. | 81 | 75.8 | 173.6 | 82 | 79.1 | 178.1 | 80.6 | 79.1 | 173.1 |
| 300 rpm Dial Readings | 259 | 252 | 166 | 257 | 270 | 144 | 298 | 268 | 113 |
| DR 200 rpm DR | 180 | 173 | 110 | 184 | 193 | 102 | 218 | 200 | 76 |
| DR 100 rpm DR | 88 | 92 | 56 | 101 | 104 | 58 | 122 | 106 | 39 |
| DR 6 rpm DR | 6 | 6 | 3 | 8 | 7 | 7 | 10 | 7.5 | 3 |
| DR 3 rpm DR | 4 | 3 | 2 | 4.5 | 4 | 4 | 6 | 4.5 | 1.5 |
| Plastic viscvosity, cPs | 256.5 | 240 | 165 | 234 | 249 | 129 | 264 | 243 | 111 |
| Yield value, lb/100 ft$^2$ | 2.5 | 12 | 1 | 23 | 21 | 15 | 34 | 25 | 2 |
| Filtration, 1000 psi | | | | | | | | | |
| Slurry Conditioning | A.C. | A.C. | A.C. | A.C. | A.C. | A.C. | A.C. | A.C. | A.C. |
| Test temperature, °F. | 80 | 180 | 350 | 80 | 180 | 350 | 80 | 180 | 350 |
| API fluid loss, ml | 18 | 21.2 | 34.4 | 17.6 | 24 | 37.6 | 15.6 | 22 | 42 |

TABLE 6

Rheology and fluid loss performance data of Example 3 at 0.50% BWOC active polymer

|  | Test N° 11 | | | Test N° 12 | | | Test N° 13 | | |
| --- | --- | --- | --- | --- | --- | --- | --- | --- | --- |
| Salt Content | 0 | | | 18%, BWOW | | | 36%, BWOW | | |
| Rheology, Baroid 286 | | | | | | | | | |
| Slurry Conditioning | B.C. | A.C. | A.C. | B.C. | A.C. | A.C. | B.C. | A.C. | A.C. |
| Test temperature, °F. | 80.5 | 77.4 | 172.5 | 77.8 | 76.6 | 172.4 | 80 | 77.3 | 176.6 |
| 300 rpm Dial Readings | 170 | 162 | 90 | 221 | 185 | 108 | 255 | 200 | 93 |
| DR 200 rpm DR | 116 | 109 | 56 | 157 | 123 | 76 | 18 | 140 | 63.5 |
| DR 100 rpm DR | 5 | 56 | 27 | 83 | 63 | 40 | 101 | 75 | 34 |
| DR 6 rpm DR | 4 | 4 | 1.5 | 6.5 | 5 | 3 | 8 | 6 | 4 |
| DR 3 rpm DR | 2.5 | 2 | 1 | 3 | 3 | 2 | 5 | 4 | 3.5 |
| Plastic viscvosity, cPs | 166.5 | 159 | 94.5 | 207 | 183 | 102 | 231 | 187.5 | 88.5 |
| Yield value, lb/100 ft$^2$ | 3.5 | 3 | −4.5 | 14 | 2 | 6 | 24 | 12.5 | 4.5 |
| Filtration, 1000 psi | | | | | | | | | |
| Slurry Conditioning | A.C. | A.C. | A.C. | A.C. | A.C. | A.C. | A.C. | A.C. | A.C. |
| Test temperature, °F. | 80 | 180 | 350 | 80 | 180 | 350 | 80 | 180 | 350 |
| API fluid loss, ml | 28.8 | 36.8 | 74.4 | 44.2 | 39.6 | 101.4 | 26 | 35.6 | 103.2 |

Copolymer of Example 4 is tested with the slurry formulation as shown in Table 7.

TABLE 7

Cement slurry formulations

| | | Formulation | | | | | | | | |
| --- | --- | --- | --- | --- | --- | --- | --- | --- | --- | --- |
| Ingredients | Wt., g | N° 14 Wt., % | N° 15 Wt. % | N° 16 Wt. % | N° 17 Wt. % | N° 18 Wt. % | N° 19 Wt. % | N° 20 Wt. % | N° 21 Wt. % | N° 22 Wt. % |
| Cement, Class "H" | 600 | — | — | — | — | — | — | — | — | — |
| Silica Flour | 210 | 35.00 | 35.00 | 35.00 | 35.00 | 35.00 | 35.00 | 35.00 | 35.00 | 35.00 |
| C-202 | 6 | 1.00 | 1.00 | 1.00 | 1.00 | 1.00 | 1.00 | 1.00 | 1.00 | 1.00 |
| Example 3 (30% T.S.) | | 1.50 | 1.50 | 1.50 | 1.00 | 1.00 | 1.00 | 0.50 | 0.50 | 0.50 |

TABLE 7-continued

Cement slurry formulations

| | | Formulation | | | | | | | | |
|---|---|---|---|---|---|---|---|---|---|---|
| Ingredients | Wt., g | N° 14 Wt., % | N° 15 Wt. % | N° 16 Wt. % | N° 17 Wt. % | N° 18 Wt. % | N° 19 Wt. % | N° 20 Wt. % | N° 21 Wt. % | N° 22 Wt. % |
| NaCl, BWOW | — | — | 18.00 | 36.00 | — | 18.00 | 36.00 | — | 18.00 | 36.00 |
| Demi-water | 303 | 50.50 | 50.50 | 50.50 | 50.50 | 50.50 | 50.50 | 50.50 | 50.50 | 50.50 |

The results are shown in Table 8, 9 and 10.

TABLE 8

Rheology and fluid loss performance data of Example 4 at 1.50% BWOC active polymer

| | Test N° 14 | | | Test N° 15 | | | Test N° 16 | | |
|---|---|---|---|---|---|---|---|---|---|
| Salt Content | 0 | | | 18%, BWOW | | | 36%, BWOW | | |
| Rheology, Baroid 286 | | | | | | | | | |
| Slurry Conditioning | B.C. | A.C. | A.C. | B.C. | A.C. | A.C. | B.C. | A.C. | A.C. |
| Test temperature, °F. | 81 | 77.5 | 172 | 78.7 | 75.7 | 174.1 | 80.4 | 78.7 | 178.3 |
| 300 rpm Dial Readings | 269 | 284 | 186 | 287 | >320 | 152 | 303 | >320 | 141 |
| DR 200 rpm DR | 189 | 198 | 124.5 | 199 | 315 | 103 | 224 | 301 | 98.5 |
| DR 100 rpm DR | 100 | 105 | 60.5 | 115 | 216 | 54 | 126 | 185 | 59 |
| DR 6 rpm DR | 7 | 5 | 4 | 9 | 19 | 4 | 8 | 16 | 4 |
| DR 3 rpm DR | 4 | 4 | 2.5 | 5 | 9.5 | 2.5 | 5 | 9 | 2 |
| Plastic viscvosity, cPs | 253.5 | 268.5 | 188.25 | 258 | #VALUE! | 147 | 265.5 | #VALUE! | 123 |
| Yield value, lb/100 ft² | 15.5 | 15.5 | −2.25 | 29 | #VALUE! | 5 | 37.5 | #VALUE! | 18 |
| Filtration, 1000 psi | | | | | | | | | |
| Slurry Conditioning | A.C. | A.C. | A.C. | A.C. | A.C. | A.C. | A.C. | A.C. | A.C. |
| Test temperature, °F. | 80 | 180 | 350 | 80 | 180 | 350 | 80 | 180 | 350 |
| API fluid loss, ml | 13.2 | 19.6 | 21.2 | 15 | 19 | 26.4 | 11.6 | 17.2 | 27.6 |

TABLE 9

Rheology and fluid loss performance data of Example 4 at 1.00% BWOC active polymer

| | Test N° 17 | | | Test N° 18 | | | Test N° 19 | | |
|---|---|---|---|---|---|---|---|---|---|
| Salt Content | 0 | | | 18%, BWOW | | | 36%, BWOW | | |
| Rheology, Baroid 286 | | | | | | | | | |
| Slurry Conditioning | B.C. | A.C. | A.C. | B.C. | A.C. | A.C. | B.C. | A.C. | A.C. |
| Test temperature, °F. | 79.4 | 75.1 | 173.1 | 77.9 | 76.1 | 174.5 | 80.2 | 78.6 | 176.3 |
| 300 rpm Dial Readings | 230 | 290 | 140 | 244 | >320 | 131 | 269 | >320 | 93 |
| DR 200 rpm DR | 157 | 207 | 91 | 175 | 298 | 91 | 195 | 268 | 63 |
| DR 100 rpm DR | 83 | 109 | 45 | 94 | 183 | 49 | 107.5 | 164 | 31 |
| DR 6 rpm DR | 5 | 8 | 3 | 7 | 15 | 5 | 8 | 15 | 3 |
| DR 3 rpm DR | 3 | 4 | 1.5 | 4 | 9 | 3 | 4.5 | 8 | 0.5 |
| Plastic viscvosity, cPs | 220.5 | 271.5 | 142.5 | 225 | #VALUE! | 123 | 242.25 | #VALUE! | 93 |
| Yield value, lb/100 ft² | 9.5 | 18.5 | −2.5 | 19 | #VALUE! | 8 | 26.75 | #VALUE! | 0 |
| Filtration, 1000 psi | | | | | | | | | |
| Slurry Conditioning | A.C. | A.C. | A.C. | A.C. | A.C. | A.C. | A.C. | A.C. | A.C. |
| Test temperature, °F. | 80 | 180 | 350 | 80 | 180 | 350 | 80 | 180 | 350 |
| API fluid loss, ml | 18 | 23.8 | 33.6 | 18 | 24.4 | 46.4 | 13 | 20.8 | 45.6 |

TABLE 10

Rheology and fluid loss performance data of Example 4 at 0.50% BWOC active polymer

| | Test N° 20 | | | Test N° 21 | | | Test N° 22 | | |
|---|---|---|---|---|---|---|---|---|---|
| Salt Content | 0 | | | 18%, BWOW | | | 36%, BWOW | | |
| Rheology, Baroid 286 | | | | | | | | | |
| Slurry Conditioning | B.C. | A.C. | A.C. | B.C. | A.C. | A.C. | B.C. | A.C. | A.C. |
| Test temperature, °F. | 81.1 | 77.9 | 174.5 | 79.6 | 77.7 | 177 | 77.3 | 77.4 | 176.1 |

TABLE 10-continued

Rheology and fluid loss performance data of Example 4 at 0.50% BWOC active polymer

| | Test N° 20 | | | Test N° 21 | | | Test N° 22 | | |
|---|---|---|---|---|---|---|---|---|---|
| Salt Content | 0 | | | 18%, BWOW | | | 36%, BWOW | | |
| 300 rpm Dial Readings | 150 | 181.5 | 71.5 | 187 | 305 | 60 | 250 | >320 | 66 |
| DR 200 rpm DR | 102 | 124 | 43 | 131 | 230 | 35 | 179 | 277 | 40.5 |
| DR 100 rpm DR | 52 | 64 | 20 | 73 | 129 | 16 | 97.5 | 169 | 19 |
| DR 6 rpm DR | 3 | 5 | 5 | 5 | 8 | 0.5 | 7 | 15 | 2 |
| DR 3 rpm DR | 2 | 4.5 | 4.5 | 3 | 5 | 0.5 | 4 | 8 | 1 |
| Plastic viscvosity, cPs | 147 | 176.25 | 77.25 | 171 | 264 | 66 | 228.75 | #VALUE! | 70.5 |
| Yield value, lb/100 ft² | 3 | 5.25 | −5.75 | 16 | 41 | −6 | 21.25 | #VALUE! | −4.5 |
| Filtration, 1000 psi | | | | | | | | | |
| Slurry Conditioning | A.C. | A.C. | A.C. | A.C. | A.C. | A.C. | A.C. | A.C. | A.C. |
| Test temperature, ° F. | 80 | 180 | 350 | 80 | 180 | 350 | 80 | 180 | 350 |
| API fluid loss, ml | 22.4 | 34 | 56.4 | 25.6 | 32 | 81 | 16.4 | 28.4 | 106 |

The results show that by reducing the polymer dosage from 1.5% to 1.0% to 0.5%, there is no significant effect on the fluid loss control properties. The copolymers of the present invention have a linear response as a function of test temperature and the filtration properties remain intact in the presence of salt. This level of rheology makes the cement slurry easily mixable and pumpable at the surface.

Polymers of the present invention are thermally stable and exhibit excellent fluid loss control properties at temperature ranging from 80° F. to 350° F. They are not salt sensitive and can tolerate a salt concentration up to saturation. Even at low polymer dosage, the polymers of the present invention still retain effectively as fluid loss control agents.

Comparative tests were performed on Hostamer 3788, a commercially available copolymer believed to be an acrylamide/AMPS copolymer under the same testing conditions. The formulations for these tests are described in Table 11 and the results appear in Tables 12, 13 and 14.

TABLE 11

Cement slurry formulations

| | | Test | | | | | |
|---|---|---|---|---|---|---|---|
| Ingredients | Wt., g | N° 23 Wt., % | N° 24 Wt., % | N° 25 Wt., % | N° 26 Wt., % | N° 27 Wt., % | N° 28 Wt., % |
| Cement, Class "H" | 600 | — | — | — | — | — | — |
| Silica Flour | 210 | 35.00 | 35.00 | 35.00 | 35.00 | 35.00 | 35.00 |
| C-202 | 6 | 1.00 | 1.00 | 1.00 | 1.00 | 1.00 | 1.00 |
| Hostamer 3788, BWOC | | 1.50 | 1.50 | 1.00 | 1.00 | 0.50 | 0.50 |
| NaCl, BWOW | — | — | 36.00 | — | 36.00 | — | 36.00 |
| Demi-water | 303 | 50.50 | 50.50 | 50.50 | 50.50 | 50.50 | 50.50 |

TABLE 12

Rheology and fluid loss performance of Hostamer 3788 at 1.50% BWOC

| | Test N° 23 | | | Test N° 24 | | |
|---|---|---|---|---|---|---|
| Salt Content | 0 | | | 36%, BWOW | | |
| Rheology, Baroid 286 | | | | | | |
| Slurry Conditioning | B.C. | A.C. | A.C. | B.C. | A.C. | A.C. |
| Test temperature, ° F. | 86.9 | 83 | 173.7 | 81.4 | 81.9 | 176.8 |
| 300 rpm Dial Readings | >320 | >320 | 254 | >320 | >320 | 217 |
| DR 200 rpm DR | >320 | >320 | 167 | >320 | >320 | 144 |
| DR 100 rpm DR | 215 | 211.5 | 85 | 305 | 255 | 77 |
| DR 6 rpm DR | 19 | 18 | 5 | 34 | 29 | 6 |
| DR 3 rpm DR | 11 | 11 | 2.5 | 22 | 17 | 3 |
| Plastic viscvosity, cPs | #VALUE! | #VALUE! | 253.5 | #VALUE! | #VALUE! | 210 |
| Yield value, lb/100 ft² | #VALUE! | #VALUE! | 0.5 | #VALUE! | #VALUE! | 7 |
| Filtrition, 1000 psi | | | | | | |
| Slurry Conditioning | A.C. | A.C. | A.C. | A.C. | A.C. | A.C. |
| Test temperature, ° F. | 80 | 180 | 350 | 80 | 180 | 350 |
| API fluid loss, ml | — | — | 39.6 | — | — | 46 |

TABLE 13

Rheology and fluid loss performance of Hostamer 3788 at 1.00% BWOC

| Salt Content | Test N° 25<br>0 | | | Test N° 26<br>36%, BWOW | | |
|---|---|---|---|---|---|---|
| Rheology, Baroid 286 | | | | | | |
| Slurry Conditioning | B.C. | A.C. | A.C. | B.C. | A.C. | A.C. |
| Test temperature, ° F. | 83.1 | 79.6 | 175.5 | 79.7 | 76.8 | 177.1 |
| 300 rpm Dial Readings | >320 | >320 | 147 | >320 | >320 | 119 |
| DR 200 rpm DR | 268 | 260 | 98.5 | >320 | 278 | 85 |
| DR 100 rpm DR | 145 | 141 | 49 | 197 | 160.5 | 44 |
| DR 6 rpm DR | 12 | 12 | 3.5 | 20 | 16 | 4 |
| DR 3 rpm DR | 8 | 8 | 2 | 14 | 10 | 2.5 |
| Plastic viscvosity, cPs | #VALUE! | #VALUE! | 147 | #VALUE! | #VALUE! | 112.5 |
| Yield value, lb/100 ft² | #VALUE! | #VALUE! | 0 | #VALUE! | #VALUE! | 6.5 |
| Filtration, 1000 psi | | | | | | |
| Slurry Conditioning | A.C. | A.C. | A.C. | A.C. | A.C. | A.C. |
| Test temperature, ° F. | 80 | 180 | 350 | 80 | 180 | 350 |
| API fluid loss, ml | — | — | 123.7 | — | — | 125 |

TABLE 14

Rheology and fluid loss performance of Hostamer 3788 at 0.50% BWOC

| Salt Content | Test N° 27<br>0 | | | Test N° 28<br>36%, BWOW | | |
|---|---|---|---|---|---|---|
| Rheology, Baroid 286 | | | | | | |
| Slurry Conditioning | B.C. | A.C. | A.C. | B.C. | A.C. | A.C. |
| Test temperature, ° F. | 81.5 | 78.3 | 175.6 | 79.4 | 77.7 | 176.8 |
| 300 rpm Dial Readings | 206 | 212 | 76 | 284 | 281 | 92 |
| DR 200 rpm DR | 142.5 | 143 | 49.5 | 204 | 203 | 62 |
| DR 100 rpm DR | 77 | 76.5 | 25 | 113 | 110 | 31 |
| DR 6 rpm DR | 7.5 | 8.5 | 2 | 14 | 12 | 3 |
| DR 3 rpm DR | 5 | 5.5 | 1 | 12 | 9 | 2 |
| Plastic viscvosity, cPs | 193.50 | 203.3 | 76.50 | 256.5 | 256.5 | 91.5 |
| Yield value, lb/100 ft² | 12.5 | 8.75 | -0.5 | 27.5 | 24.5 | 0.5 |
| Filtration, 1000 psi | | | | | | |
| Slurry Conditioning | A.C. | A.C. | A.C. | A.C. | A.C. | A.C. |
| Test temperature, ° F. | 80 | 180 | 350 | 80 | 180 | 350 |
| API fluid loss, ml | — | — | 251.9 | — | — | 381.2 |

The results shown in Tables 12, 13 and 14 indicate clearly that the fluid loss data at 350° F. are much higher than those obtained with the sample of Example 4. Under same testing conditions, the filtrate values vary from about 39 ml to 252 ml for polymer loading varying from 1.5% down to 0.5% BWOC against about 25 ml up to 74 ml for Example 4. The addition of salts into the slurry system up to saturation (36% BWOW NaCl) shows a more pronounced effect on fluid loss control properties of the competitive fluid loss additive at low polymer dosage (0.5% BWOC) with a fluid loss of about 382 ml against 103 ml for the Example 4.

Performance Testing in Drilling Fluids

As for oil well cement slurries, the performance testing of the drilling fluids were conducted in terms of rheology and fluid loss properties. The performance attributes were evaluated in NaCl saturated bentonite mud after ageing overnight. To check the thermal resistance of the candidate samples, the mud suspensions were prepared in duplicate. One of the suspensions was aged under static conditions and the other one hot rolled at 160° C. overnight. The rheology profile for both samples was determined using Fann 35 type viscometer and the filtration properties using standard API filter press under 100 psi pressure at room temperature.

First, a prehydrated bentonite was prepared by adding 28.57 g of Aquagel bentonite (available from Baroid) into 1 liter freshwater and mixed for 4 hours minimum at 1500 rpm. The bentonite was then left to hydrate for 24 hours prior to use. The bentonite suspension was homogenized for 10 minutes prior to use.

The drilling fluid was then prepared by mixing, on Hamilton Beach mixer, 356 g pre-hydrated bentonite, 125 g NaCl, 10 g Rev-dust, 2 cc NaOH (10% solution), 4 g Starch and 2 g candidate polymer (active content). The suspension was mixed for a total of 40 minutes. Afterwards, the suspensions were aged as described above.

Comparative tests were performed with AquaPAC.LV (premium quality polyanionic cellulose available from Aqualon) and Polydrill (available from SKW, Trosberg, Germany) a commercially available copolymer believed to be an AMPS based copolymer under the same testing conditions. The formulations for these tests are described in Table 15 and the results appear in Tables 16.

TABLE 15

Drilling Fluid Composition

| Ingredients | N° 29<br>Wt., g<br>(active) | N° 30<br>Wt., g<br>(active) | N° 31<br>Wt., g<br>(active) |
|---|---|---|---|
| Pre-hydrated bentonite | 356 | 356 | 356 |
| NaCl | 125 | 125 | 125 |
| Rev-dust | 10 | 10 | 10 |
| 10% NaCl solution | 2cc | 2cc | 2cc |
| Starch | 4 | 4 | 4 |
| AquaPAC.LV | 2 | — | — |
| Example 4 (30% T.S.) | — | 2 | — |
| Polydrill | — | — | 2 |

TABLE 16

Rheology and Fluid Loss Performance Testing Data

| | Test N° 29 | | Test N° 30 | | Test N° 31 | |
|---|---|---|---|---|---|---|
| | Static | Hot Rolling | Static | Hot Rolling | Static | Hot Rolling |
| Rheology, Baroid 286 | | | | | | |
| pH before aging | 9.26 | — | 8.89 | — | 9.01 | — |
| pH after aging | 9.03 | 6.39 | 8.51 | 5.7 | 8.59 | 6.28 |

TABLE 16-continued

Rheology and Fluid Loss Performance Testing Data

|  | Test N° 29 | | Test N° 30 | | Test N° 31 | |
| --- | --- | --- | --- | --- | --- | --- |
|  | Static | Hot Rolling | Static | Hot Rolling | Static | Hot Rolling |
| Aging Temperature, ° C. | R.T. | 160 | R.T. | 160 | R.T. | 160 |
| Test temperature, ° C. | 25.9 | 25.1 | 25.1 | 23.2 | 25 | 25.2 |
| 600 rpm Dial Readings | 51.5 | 10 | 21 | 16 | 21 | 28.5 |
| 300 rpm DR | 29 | 6 | 9 | 8 | 10.5 | 17 |
| 200 rpm DR | 20.5 | 4 | 7 | 5.5 | 8 | 13.5 |
| 100 rpm DR | 12 | 3 | 4 | 3.5 | 5 | 9.5 |
| 6 rpm DR | 1.5 | 1.5 | 1.5 | 1 | 1 | 7 |
| 3 rpm DR | 1 | 1 | 1.5 | 1 | 1 | 7 |
| Apparent Viscosity, cPs | 25.75 | 5 | 10.5 | 8 | 10.5 | 14.25 |
| Plastic viscvosity, cPs | 22.5 | 4 | 12 | 8 | 10.5 | 11.5 |
| Yield value, lb/100 ft$^2$ | 6.5 | 2 | −3 | 0 | 0 | 5.5 |
| Filtration, 100 psi |  |  |  |  |  |  |
| Test temperature | R.T. | R.T. | R.T. | R.T. | R.T. | R.T. |
| API fluid loss, ml | 2.9 | 135.2 | 6.3 | 105.6 | 24.5 | 173.7 |
| Remarks | Thin Filter Cake | | Thin Filter cakes | | Thick & foamy Tfilter cake | |

The data in the Table 16 indicate clearly that the copolymer of Example 4 performs efficiently as a fluid loss control additive for drilling fluids. Under hot rolling conditions at 160° C., the rheology undergoes a slight decrease but it remains in same magnitude while the fluid loss was much higher but far below the filtrate values of the comparative samples (AquaPAC.LV and Polydrill).

Performance Testing in Completion Fluids

As in previous application examples, the performance of the co-polymer of this invention was evaluated in a high-density completion fluid. The performance attributes were evaluated in a ZnBr$_2$/CaBr$_2$ brine, having a density of 19.2 ppg (pounds per gallon), after ageing overnight. To check the thermal resistance of the candidate samples, the mud suspensions were prepared in duplicate. One of the suspensions was aged under static conditions and the other one hot rolled at 160° C. overnight. The rheology profile for both samples was determined using Fann 35 type viscometer and the filtration properties using standard API filter press under 100 psi pressure at room temperature.

The completion fluid was prepared by mixing, on Hamilton Beach mixer, 805 g (1 lab bbl equivalent) ZnBr$_2$/CaBr$_2$ brine, 2 g candidate polymer (active basis) and 2 g MgO to adjust pH. The brines were mixed for a total of 60 minutes. Afterwards, the viscosified brines were aged as described above.

Comparative tests were performed under the same testing conditions with a standard HydroxyEthyl cellulose for completion fluids (Natrosol 250HH-R-P available from Aqualon, The formulations for these tests are described in Table 17 and the results appear in Tables 18.

TABLE 17

Drilling Fluid Composition

| Ingredients | N° 32 Wt., g (active) | N° 33 Wt., g (active) |
| --- | --- | --- |
| ZnBr2/CaBr2 Brine | 805 | 805 |
| Example 4 (30% T.S.) | 2 | — |

TABLE 17-continued

Drilling Fluid Composition

| Ingredients | N° 32 Wt., g (active) | N° 33 Wt., g (active) |
| --- | --- | --- |
| Natrosol 250HHR-P | — | 2 |
| MgO | 2 | 2 |

TABLE 18

Rheology and Fluid Loss Performance Testing Data

|  | Test N° 32 | | Test N° 33 | |
| --- | --- | --- | --- | --- |
|  | Static | Hot Rolling | Static | Hot Rolling |
| Rheology, Baroid 286 |  |  |  |  |
| pH before aging | 1.22 | — | 1.18 | — |
| pH after aging | 1.22 | 1.41 | 1.18 | 1.2 |
| Aging Temperature, ° C. | R.T. | 160 | R.T. | 160 |
| Test temperature, ° C. | 27 | 23.9 | 23.7 | 23.9 |
| 600 rpm Dial Readings | 41 | 44 | 64 | 47 |
| 300 rpm DR | 25 | 22 | 30 | 24 |
| 200 rpm DR | 17 | 15 | 22.5 | 16 |
| 100 rpm DR | 9 | 8 | 13 | 8.5 |
| 6 rpm DR | 2 | 1.5 | 2 | 1.5 |
| 3 rpm DR | 1.5 | 1 | 2 | 1 |
| Apparent Viscosity, cPs | 20.5 | 22 | 32 | 23.5 |
| Plastic viscvosity, cPs | 16 | 22 | 34 | 23 |
| Yield value, lb/100 ft$^2$ | 9 | 0 | −4 | 1 |
| Filtration, 100 psi |  |  |  |  |
| Test temperature | R.T. | R.T. | R.T. | R.T. |
| API fluid loss, ml | 64.6 | 11.8 | 198.1 | 310.8 |

The data in the Table 18 indicate clearly that the copolymer of Example 4 performs efficiently as a fluid loss control additive for completion fluids. Under hot rolling conditions at 160° C., the rheology remains stable and the fluid loss control properties are even improved. Under same conditions, the comparative sample (Natrosol 250 HHR-P) shows a noticeable variation of the rheology with a total loss of the fluid loss control properties.

Performance Testing of Polymer Blends Concept in Cementing Applications

Next to its use as a single fluid loss additive in previous cement slurry compositions, the functionality of polymer blends concept was investigated under same testing conditions (Table 19). The example 4 of this invention was evaluated in combination with a sample of cementing grade HEC (Natrosol 250GXR, available from Hercules Incorporated) and a sample of Starch styrene Butadiene co-polymer (available from Penford). The usefulness of the blend concept was tested at 1.5% BWOC total active polymer (1.0% example 4 and 0.5% HEC or Starch).

The results in Table 20 show that comparatively to tests N° 14 and N° 17, combining example 4 with HEC (test N° 34) does provide very good fluid loss control properties at tested temperatures. The corresponding fluid loss data stand between those of tests example N° 14 and N° 17. However, incorporating HEC into the system clearly increases the overall rheology of the cement slurry.

Contrary to HEC, the test example N° 35 shows that incorporating Starch styrene butadiene co-polymer into the cement slurry does not have any significant effect on the final rheology profile. Both rheology and fluid loss control properties of the test example N° 34 are comparable to those of test N° 17.

TABLE 19

Cement Slurry Composition
Cement slurry formulations

| Ingredients | Wt., g | Test N° 34 Wt., % | Test N° 35 Wt. % |
|---|---|---|---|
| Cement, Class "H" | 600 | — | — |
| Silica Flour | 210 | 35.00 | 35.00 |
| C-202 | 6 | 1.00 | 1.00 |
| Example 4 (30% T.S.) | 6 | 1.00 | 1.00 |
| Natrosol 250GXR | — | 0.50 | — |
| Penweave Starch SD-50S | — | — | 0.50 |
| Demi-water | 303 | 50.50 | 50.50 |

TABLE 20

Rheology and Fluid Loss Performance Testing Data
Rheology and fluid loss performance data of blend polymers

| | Test N° 34 | | | Test N° 35 | | |
|---|---|---|---|---|---|---|
| Rheology, Baroid 286 | | | | | | |
| Slurry Conditioning | B.C. | A.C. | A.C. | B.C. | A.C. | A.C. |
| Test temperature, ° F. | 87.1 | 79.3 | 175.3 | 81.3 | 77.6 | 176.7 |
| 300 rpm Dial Readings | >320 | >320 | >320 | 234 | 246 | 143 |
| DR 200 rpm DR | >320 | >320 | >320 | 161 | 166 | 90 |
| DR 100 rpm DR | >320 | >320 | 230 | 89.5 | 89.5 | 44 |
| DR 6 rpm DR | 41 | 43.5 | 14 | 5 | 56 | 3 |
| DR 3 rpm DR | 21.5 | 22 | 6.5 | 2.5 | 2.5 | 2 |
| Plastic viscvosity, cPs | #VALUE! | #VALUE! | #VALUE! | 216.75 | 234.75 | 148.5 |
| Yield value, lb/100 ft² | #VALUE! | #VALUE! | #VALUE! | 17.25 | 11.25 | −5.5 |
| Filtration, 1000 psi | | | | | | |
| Slurry Conditioning | A.C. | A.C. | A.C. | A.C. | A.C. | A.C. |
| Test temperature, ° F. | 80 | 180 | 350 | 80 | 180 | 350 |
| API fluid loss, ml | 14 | 19.2 | 25.6 | 18 | 24.6 | 36 |

The data in the Table 20 indicate clearly that Examples of this invention may be blended with other standard fluid loss additives to provide improved fluid loss control properties The copolymers of the present invention are not limited to use in oil field. They may be effectively utilized as rheology modifiers or flow control agents, thickeners, suspending agent or protective colloids in construction, paint, biomedical gel and personal care applications. The hydrogels are uniform conductive and posses other properties as effective medical electrode materials, such as cohesive strength, adhesion to skin, wetting of hair, ease of removal, lubricity, hydrolytic stability, and biocompatible. The personal care applications as thickeners in skin creams, shampoos, hair setting gels, conditioners, and shaving forms. The copolymers are also useful to improve dye ability of acrylic fibers, nylon 6, and polypropylene compositions in the textile industries and electro deposition formulations and electrically conductive polymer industries While this invention has been described with respect to particular embodiments thereof, it is apparent that numerous other forms and modifications will be obvious from this disclosure to those skilled in the art. The appended claims and this invention generally should be construed to cover all such obvious forms and modifications which are within the true spirit and scope of the present invention.

We Claim:

1. A copolymer composition comprising a copolymer including:

(A) a monomeric repeat unit having the structure:

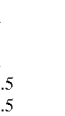

wherein E comprises the repeat unit obtained after polymerization of acrylamide or a substituted acrylamide;

(B) a repeat unit obtained after the polymerization of a sulfonate containing compound having the structure:

$$
\begin{array}{c}
R_1 \\
| \\
(CH_2\text{---}C\text{---}) \\
| \\
C\text{=}O \\
| \\
NH \\
| \\
R_3\text{---}C\text{---}R_2 \\
| \\
CH_2 \\
| \\
SO_3M^+
\end{array}
$$

wherein $R_1$ is hydrogen or a lower alkyl (C1–C5), $R_3$ and $R_2$ are identical or different and are selected from the group consisting of hydrogen and (C1–C5) allyl groups and $M^+$ is a water-soluble cation or hydrogen; and, (C) a repeat unit obtained from the polymerization of a substituted allyl alkylene ether compound having the structure:

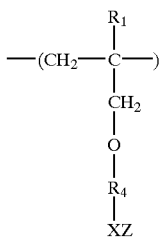

wherein $R_1$ is hydrogen or a lower alkyl (C1–C5), $R_4$ is a hydroxyl substituted alkylene group having from 1 to 6 carbon atoms, or a non-substituted allyl or alkylene group having from 1 to 6 carbon atoms, X is an anionic radical, and Z is one or more hydrogen or water-soluble cation which together counterbalance the charge of X; and, (D) a repeat unit obtained from the polymerization of a monomer selected from the group consisting of acrylic acid, methacrylic acid, maleic acid or anhydride, itaconic acid, crotonic acid, fumaric acid, and citraconic acid, wherein the individual mole percentage of repeat units (A), (B), (C) and (D) is from about 5% to about 95% with the proviso that the sum of the mole percentages is 100%.

2. The composition of claim 1 wherein a cross-linking agent is also present selected from the group consisting of methylenebis(meth)acrylamide, polyethyleneglycol di(meth)acrylate, hydroxyacrylamide, allyl glycidyl ether, and glycidyl acrylate.

3. The composition of claim 1 wherein the substituted acrylamide is an N-aklylacrylamide.

4. The composition of claim 3 wherein the N-alkylacrylamide is selected from the group consisting of N-methacrylamide, N-isopropylacrylamide, N-butylacrylamide, N,N-dimethylacrylamide, and N-hydroxymethylacrylamide.

5. The composition of claim 1 wherein the sulfonate containing compound is 2-acrylamide-2-methylpropanesulfonic acid.

6. The composition of claim 1 wherein the substituted allyl alkylene ether compound is selected from the group consisting of 3-allyloxyhydroxypropanephosphate, 3-allyloxyhydroxypropanesulfonate, and 3-allyloxyhydroxypropanephosphite.

7. The composition of claim 1 wherein the monomer is acrylic acid.

8. The composition of claim 1 wherein the copolymer comprises monomeric repeat units (A), (B), (C) and D) having the structure:

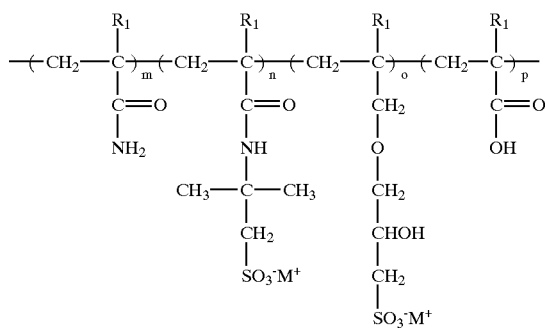

wherein $R_1$ is independently selected from the group consisting of hydrogen and (C1 to C5) alkyl groups, M is hydron or water soluble cation and the individual mole percentage of repeat units m, n, o and p is from about 5% to 95% with the proviso that the sum of the mole percentages is 100%.

9. The composition of claim 8 wherein m is from about 20 mol % to about 70 mol % n is from about 20 mol % to about 60 mol %, o is from about 5 mol % to about 40 mol % and p is from about 5 mol % to about 40 mol % with the proviso that the sum of the mol % is 100%.

10. The composition of claim 8 wherein m is from about 40 mol % to about 60 mol %, n is from about 30 mol % to about 50 mol %, o is from about 10 mol % to about 30 mol % and p is from about 10 mol % to about 30 mol % with the proviso that the sum of the mol % is 100%.

11. A process comprising (A) reacting an acrylamide or substituted acrylamide, a sulfonate containing monomer, and a substituted allyl alkylene ether compound selected from the group consisting of 3-allyloxyhydroxypropanephosphate, 3-allyloxyhydroxypropanesulfonate, and 3-allyloxyhydroxypropanephosphite for a sufficient time and at a sufficient temperature to form an intermediate product and then (E) reading said intermediate product with a sufficient amount of a monomer selected from the group consisting of acrylic acid, methacrylic acid, maleic acid or anhydride, itaconic acid, crotonic acid, fumaric acid, and citraconic acid at a sufficient temperature and for a sufficient time to form a final product.

12. The process of claim 11 wherein step (A) filter comprises the addition of a cross-linking agent selected from the group consisting of methylenebis(meth)acrylamide, polyethyleneglycol bis(meth)acrylate, hydroxyacrylamide, allyl glycidyl ether, and glycidyl acrylate.

13. The process of claim 11 wherein the substituted acrylamide is an N-alkylacrylamide.

14. The process of claim 13 wherein the N-alkylacrylamide is selected from the group consisting of N-methacrylamide, N-isopropylacrylamide, N-butylacrylamide, N,N-dimethylacrylamide, and N-hydroxymethylacrylamide.

15. The process of claim 11 wherein the sulfonate containing monomer comprises 2-acrylamido-2-methylpropanesulfonic acid.

16. The process of claim 11 wherein the substituted allyl alkylene ether compound is selected from the group consisting of 3-allyloxyhydroxypropanephosphate, 3-allyloxyhydroxypropanesulfonate, and 3-allyloxyhydroxypropanephosphite.

17. The process of claim 11 wherein the substituted allyl alkylene ether compound is 3-allyloxyhydroxypropanesulfonate.

18. The process of claim 11 wherein the monomer is selected from the group consisting of acrylic acid, methacrylic acid, maleic acid or anhydride, itaconic acid, crotonic acid, fumaric acid, and citraconic acid.

19. The process of claim 18 wherein the monomer is acrylic acid.

20. A process comprising (A) reacting a monomer selected from the group consisting of acrylic acid, methacrylic acid, maleic acid or anhydride, itaconic acid, crotonic acid, fumaric acid, and citraconic acid and a sulfonate containing monomer compound for a sufficient time and at a sufficient temperature to form an intermediate product and then (B) reacting said intermediate product with a sufficient amount of a substituted allyl alkylene ether compound selected from the group consisting of 3-allyloxyhydroxypropanephosphate, 3-allyloxyhydroxypropanesulfonate, and 3-allyloxyhydroxypropanephosphite and acrylamide or a substituted acrylamide at a sufficient temperature and for a sufficient time to form a final product.

21. The process of claims 20 wherein step (A) further comprises the addition of a crosslinking agent selected from the group consisting of methylenebis(meth)acrylamide, polyethyleneglycol di(meth)acrylate, hydroxyacrylamide, allyl glycidyl ether, and glycidyl acrylate.

22. The process of claim 20 wherein the substituted acrylamide is an N-alkylacrylamide.

23. The process of claim 20 wherein the N-alkylacrylamide is selected from the group consisting of N-methacrylamide, N-isopropylacrylamide, N-butylacrylamide, N,N-dimethylacrylamide, and N-hydroxymethylacrylamide.

24. The process of claim 20 wherein the sulfonate containing monomer comprises 2-acrylamido-2-methylpropanesulfonic acid.

25. The process of claim 20 wherein the substituted allyl alkylene ether compound is 3-allyloxyhydroxypropanesulfonate.

26. The process of claim 20 wherein the monomer is acrylic acid.

27. The composition of claim 8 wherein the copolymer has a weight average molecular weight from about 50,000 to about 3,000,000.

28. The composition of claim 27 wherein the copolymer has a weight average molecular weight from about 100,000 to about 1,500,000.

29. The composition of claim 28 wherein the copolymer has a weight average molecular weight from about 140,000 to about 1,000,000.

* * * * *